F. J. LEEAK.
AUTOMOBILE LOCK.
APPLICATION FILED JAN. 14, 1918.
1,277,088.
Patented Aug. 27, 1918.
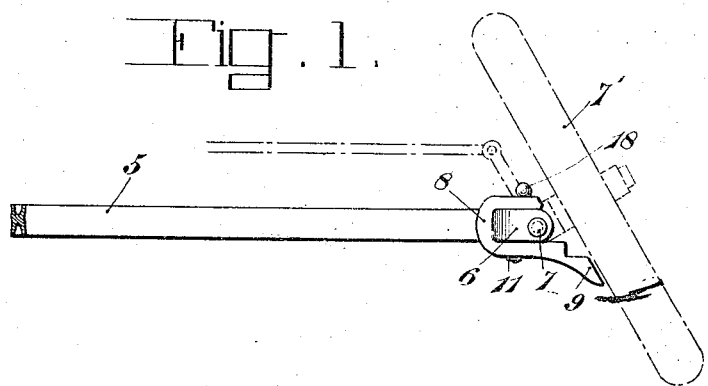
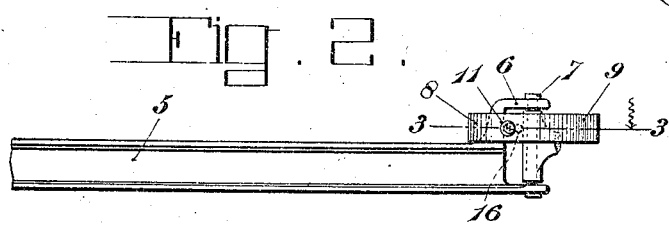
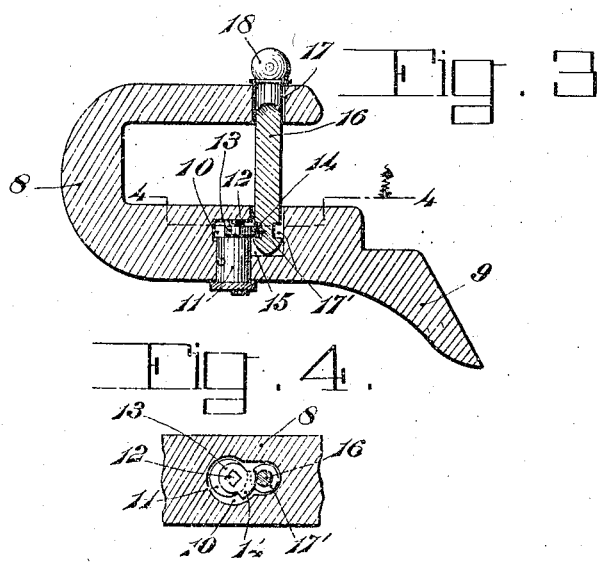

UNITED STATES PATENT OFFICE.

FRANCIS J. LEEAK, OF DETROIT, MICHIGAN.

AUTOMOBILE-LOCK.

1,277,088.   Specification of Letters Patent.   Patented Aug. 27, 1918.

Application filed January 14, 1918. Serial No. 211,792.

*To all whom it may concern:*

Be it known that I, FRANCIS J. LEEAK, a citizen of the United States, residing at Detroit, in the county of Wayne, State of Michigan, have invented certain new and useful Improvements in Automobile-Locks; and I do hereby declare the following to be a full, clear, and exact description of the invention, such as will enable others skilled in the art to which it appertains to make and use the same.

The present invention relates to new and useful improvements in locking devices applicable to automobiles to prevent their unauthorized movement, and more particularly of that type adapted to lock the steering gear against movement whereby said gear may be held to direct the automobile in a circle.

It is the object of this invention to provide a device which may be removably attached in a most ready manner to the steering knuckle structure of one end of an automobile axle, to prevent turning movement of said knuckle.

It is more particularly an object to provide such a device which is of exceedingly simple and durable structure and wherein the various operating parts are housed, particularly when in operative position, in such manner as to prevent their breakage to render the device ineffective.

With the above and other objects and advantages in view, the invention resides more particularly in the novel combination, formation and arrangement of parts hereinafter described, and pointed out in the appended claims.

In the accompanying drawings:

Figure 1 is a plan view of one end portion of the front axle structure of an automobile, showing my improved locking device associated therewith.

Fig. 2 is a front elevation of what is shown in Fig. 1.

Fig. 3 is a horizontal sectional view through the locking device removed, on the line 3—3 of Fig. 2.

Fig. 4 is a detail sectional view on the line 4—4 of Fig. 3.

Referring now more particularly to the drawings, 5 designates the front axle of a well known type of automobile having an upwardly inclined journal arm 6 for the knuckle post 7 carrying the axle of the wheel 7', it being understood that the present invention is adapted for use with any type of automobile embodying this general structure.

The improved locking device comprises a U-shaped body member 8 adapted to embrace the journal arm of the axle, with its ends disposed toward the wheel, and one of said ends, preferably the forward end with respect to its relation to the automobile, is provided with a wheel abutting shoe 9 extending outwardly at an obtuse angle. For locking this body member to the steering knuckle, the shoe bearing leg thereof is provided with a well 10 open at its outer side and into which is screwed a cylindrical lock member 11 of preferably conventional nature and having its bolt 12 offset from the axis of the lock casing and squared for engagement in a corresponding aperture of a locking plate 13 having a wing 14 thereon adapted to project into a socket 15 opening at the inner face of the body leg and communicating at one side with a side of the well. This socket is adapted to receive the end of a locking pin 16 passed through a transverse bore 17 of the other leg of the body member whereby the wing 14 may engage in a peripheral groove 17' of the pin. In the operative position of the device, this pin extends between the journal arm 6 and the knuckle post 7 and thus holds the locking member securely in place whereby its shoe 9 is effective to prevent a free movement of the wheel 8. The outer end of the pin 16 is provided with a finger knob 18 to permit its ready manipulation, and the locking wing 14 of the lock 11 moves into the well 10 to release the pin.

A readily applied locking device is thus provided which is of exceedingly simple structure and susceptible of most economical manufacture, comprising as it does, a body member, a locking pin and a conventional lock member, the only marching essential in the body member being the threading for the lock, although it may be desirable to bore out the apertures 10, 15 and 17 instead of forming them with the casting. The shoe carrying leg of the body member is of considerably greater thickness than the other leg, to house the lock and to withstand the strain of a possible attempt to move the wheel. It is noted that in the application of the device, the locking pin is housed within the legs of the body member and within the steering knuckle structure, whereby it cannot be readily broken to render the device ineffective.

What is claimed is,

1. An automobile locking device comprising a U-shaped body member adapted to embrace the knuckle post journal arm of an axle, a stop member on one of the legs of said body member, and a locking pin adapted for securement to the legs of the body member and to extend between the knuckle post and the journal arm of the axle.

2. An automobile locking device comprising a U-shaped body member adapted to embrace a portion of the steering knuckle structure of an automobile, one of the legs of the body member being formed with a well opening at its outer side and with a socket opening at its inner side and communicating with the well on one side thereof, a lock mechanism in the well including a member extensible into the socket and a locking pin adapted for securement to the other leg of the body member and having one end engageable in the socket and provided with a groove for receiving the locking member.

In testimony whereof, I affix my signature, in the presence of two witnesses.

FRANCIS J. LEEAK.

Witnesses:
JOSEPH B. BECKENSTEIN,
FRANK ALTMAN.